INVENTOR:
ROBERT A. MILLER
BY Joseph Januszkiewicz
ATTORNEY

INVENTOR:
ROBERT A. MILLER
BY Joseph Januszkiewicz
ATTORNEY

March 24, 1964  R. A. MILLER  3,126,064
WIRE LINE CORING TOOL

Filed June 13, 1960  4 Sheets-Sheet 4

INVENTOR:
ROBERT A. MILLER
BY
Joseph Januszkiewicz
ATTORNEY

United States Patent Office 3,126,064
Patented Mar. 24, 1964

3,126,064
WIRE LINE CORING TOOL
Robert A. Miller, Culver, Ind., assignor to Joy Manufacturing Company, Pittsburgh, Pa., a corporation of Pennsylvania
Filed June 13, 1960, Ser. No. 35,662
8 Claims. (Cl. 175—246)

This invention relates to an improved drilling apparatus and more particularly to an improved wire line core barrel assembly whereby an elongated hole may be rapidly drilled.

As is well known the purpose of core drilling is to obtain as great a length of core as is possible in the form in which it exists in the underground formation through which the drill has passed. The various core lengths are then removed and stored for visual inspection. In such drilling art a series of long tubes are coupled together in longitudinal relationship and have an elongated tube at its drilling end which carries the drilling bit. Such series of tubes are commonly called a drill string which carry at its lower end a core barrel inner tube assembly. Although various methods of drilling are known one preferred method of drilling is by means of a wire line core barrel, that is, a core barrel is supported independently of the drilling bits at the end of the drill string so that the core barrel can quickly and easily be removed by a dropped wire line. Heretofore wire line barrels have had several disadvantages whereby they cannot be universally employed. One principal disadvantage of known wire line core barrels is that they have provided for a drill coolant passage therethrough at all times so that it is impossible to locate the core barrel in drilled openings other than those in which the force of gravity will pull the core barrel downwardly therein. Again, prior wire line core barrels have provided a single means for coolant shut off the operating characteristics of which are not desired for varying drilling condition. Further, the prior wire line core barrels have in general been of a rather intricate structure having elements therein easily subject to failure.

Accordingly, an object of this invention is to provide a drilling apparatus having a new and improved wire line core barrel.

Another object of this invention is to provide a drilling apparatus having a wire line core barrel which can be pushed through a drill string by means of a fluid force acting thereon.

A further object of this invention is to provide a core drill string having a detachable, retractable wire line core barrel assembly with an improved simplified latching mechanism to lock the core barrel assembly to the core drill string.

A further object of this invention is to provide improved means for easily and readily securing and releasing the wire line core barrel from the core drill string and moving it relative to the drill string.

A further object of this invention is to provide a wire line core barrel that has valve means providing variable shut off characteristics which valve means regulates the rate of descent.

A further object of this invention is to provide a new and novel cooling and lubricating system for the drill bit of a drill string with a wire line core barrel assembly.

A further object of this invention is to provide a wire line core barrel cooperable with the drill string to provide dual passage means cooperable with a valve to give the operator a signal upon taking of a full core sample or blockage thereof while maintaining cooling to the drill bit.

A further object of this invention is to provide a drilling apparatus having a wire line core barrel which has dual passage means for conducting cooling and cleansing fluid to the drill wherein the shut off means closes off the main flow which is one of the dual passage means while the other passage means remains open to permit a limited amount of fluid to flow to the bit to prevent the bit from overheating.

These and other objects and advantages of the invention will hereinafter more fully appear. In the accompanying drawings there are shown for purposes of illustration one form and modifications which the invention may assume in practice.

Figure 2A:
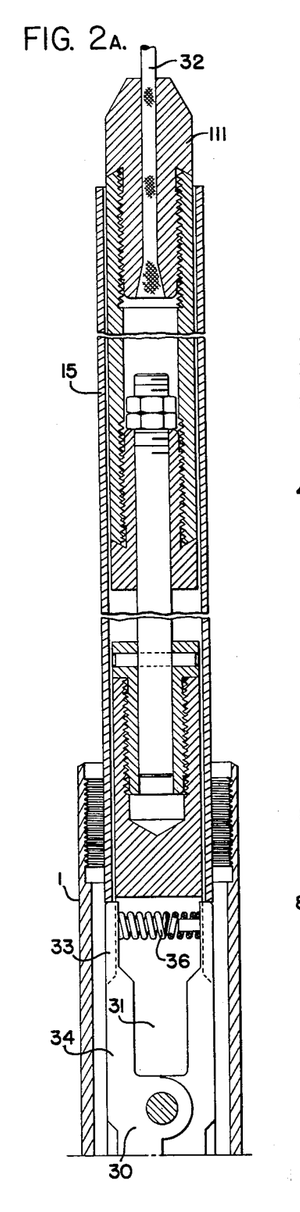
FIGS. 2a, 2b and 2c are longitudinal cross sectional views, having portions thereof shown in elevation, of the drilling apparatus constructed in accordance with the principles of this invention which when longitudinally aligned show the entire drilling apparatus of this invention.
Figures 2B, 2C:
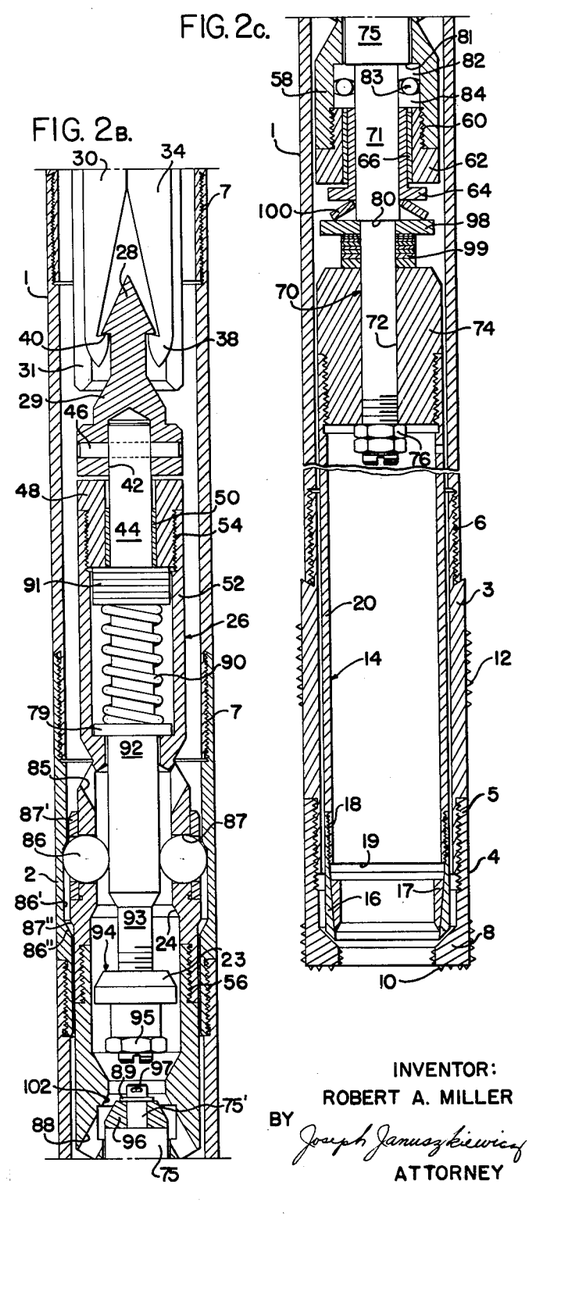

Referring to FIGS. 2a, 2b and 2c, a plurality of elongated tube sections or drill rods 1, only some of which are shown, are suitably connected together in axial alignment in a manner as is well known in the art such as by threads 7 to form an elongated tubular drill string. An elongated tubular coupling section 2 is threadedly secured between the last two sections of the drill string. The coupling section 2 has an intermediate longitudinally elongated annular groove 86' extending radially outwardly of the inner surface thereof which is larger in diameter than the inner diameters of the drill rods 1. The annular groove 86' terminates at its lower end in a downwardly and inwardly sloping shoulder portion 86" for a purpose as will be explained hereinafter. An elongated tubular reaming section 3 is suitably secured at its upper end to the lower end of the last drill rod 1 such as by threads 6, so as to be rotatable upon rotation of the drill string. A tubular bit 4 is secured at its upper end to the lower end of the reaming section 3 in any suitable manner such as by threads 5 which bit 4 may be of any suitable type and construction as is well known in the art. As shown bit 4 is provided with an integral radially inwardly extending annular ring portion 8 at its lower end for supporting suitable cutting means such as diamonds 10 on the inner and lower surfaces of the ring portion 8. Suitable cutting means such as the diamonds 10 are also suitably supported on the outer surface of the bit 4 outwardly adjacent the ring portion 8. Additional cutting means such as diamonds 12 are normally secured to the outer surface of the reaming section 3 which are spaced longitudinally upwardly from the cutting end of the bit 4 to ream the hole drilled by the lower end of bit 4.

As shown in FIG. 2c, the lower end of a wire line core barrel 14 comprises a tubular core lifter case 16 having its upper end suitably secured, such as by threads 18, to the lower end of a tubular core receiver tube 20. The core lifter case 16 is of any suitable well known construction having a movable core lifter 17 for gripping, breaking and holding a drilled core when the drill string is backed off, as is well known in the art. With the structure heretofore described rotation of the drill string causes the drill bit 4 to rotate whereby the diamonds 10 cut a core having an external diameter approximately equal to the distance between the outer cutting edges of the diamonds 10 on the inner surface of the ring portion 8. In such drilling the drilled core passes through the opening in the ring portion 8 into and through the lifter case 16 into the core receiver tube 20. The core lifter 17 is elevated as the core enters the core receiver tube 20 until the core lifter 17 abuts against a shoulder 19 formed by the lower end of the core receiver tube 20. On further drilling, the cut core rises upwardly relative to the drill string, with the lifter case 16 and lifter 17 relatively stationary with respect to each other. The cut core gradually rises upwardly through the length of the core receiver tube 20 as the drill string 1 passes downwardly until the length thereof is full of cut core or blocked due to breakage of the core. Accordingly, the core receiver tube 20 is of a length to receive the maximum length of core as is possible to elevate within the limitations of the described apparatus. When the core receiver 20 is filled or blocked as is well understood in the art, the drill string is slightly elevated so that the core lifter case 16 is also elevated relative the core lifter 17 and the core which is firmly attached to the ground formation. Such elevation causes the core lifter 17 to be reduced in its cross section due to the wedging action of the tapering sides of the core lifter case 16 as it is elevated relative to core lifter 17 which action breaks off the core and thereby locks the core, core lifter 17 to the core receiver tube 20 whereby a free core portion (not shown) is provided within the tube 20 for lifting.

It will be noted that the core receiver 20 with the case 16 attached forms the lower portion of an elongated specially constructed inner tube assembly 26 the upper end of which has an elongated spearhead 28 extending centrally upwardly and tapering to a point within the drill string. In order to remove the assembly 26 from the drill string an elongated latch assembly 30, which is generally known as an overshot and is so identified hereinafter, is lowered, by means of a wire cable 32 into engagement with the spearhead 28 of the inner tube assembly 26. The overshot 30 is suitably connected to the wire cable 32 by means of a wire coupling element 111. The overshot 30 grasps the pointed member 28 so that the overshot 30 or lowering the wire line core barrel 14 and inner tube assembly 26 into position via overshot 30. When the overshot assembly 30 is lowered into the drill string the latch release 15 is lowered with the overshot 30. After overshot 30 passes over the spearhead 28, further downward movement of the overshot 30 relative to the stationary spearhead 28 will cause the latches 34 to move apart due to engagement with opposed outwardly tapering circular portion 29 on the lower portion of the spearhead 28. Such movement of the latches 34 causes the upper ends 33 thereof to be moved together against the action of the spring 36. The tubular overshot latch release 15 continues downward over the overshot 30 so that the lower end of the tubular overshot latch release 15 encompasses and engages the upper ends 33 of the latches 34 and thus maintains the hook portions 38 of latches 34 in laterally spaced unlocked relationship to permit the latches 34 to clear the spearhead 28 when reeling in the wire line 32 and the overshot 30.

Referring to the tube assembly 26 it will be noted that the lower end of the spearhead 28 is provided with a central longitudinally upwardly extending bore 42 which receives the upper end of a cylindrical shaft 44 which extends substantially centrally through a portion of the drill string. The spearhead 28 is secured to the shaft 44 in any suitable manner such as by means of pin 46 extending through a laterally aligned clearance opening in the portion of the shaft 44 in the bore 42 and the portion of the spearhead 28 laterally adjacent the bore 42. An elongated generally tubular upper plug 48 encompasses the portion of the shaft 44 below the spearhead 28 which plug 48 is longitudinally slidably supported on the shaft 44 by means of a suitable cylindrical bearing 50 therebetween. The upper end of a formed tubular member 52 with the other portions of the tube assembly 26, and the accompanying core receiver tube 20 and core sample, may then be reeled out of the drill string. In view of the fact that the overshot 30 and the tube assembly 26 are moved longitudinally within the drill string it will be obvious that all the components thereof must be of a size to permit them to pass freely through the drill string.

Inasmuch as the overshot 30 does not constitute a part of this invention and is well known in the art a detailed description thereof is not believed to be warranted. It will be noted, however, that the lower end of the overshot 30 has a pair of elongated latches 34 which are pivotally connected intermediate their ends to permit their opposite ends thereof to move generally laterally of the drill string. Upper ends 33 of the latches 34 are biased apart by means of a suitable guided closed end helical spring 36 and the lower end of each latch 34 is provided with a hook shaped portion 38. With such a construction when the overshot 30 is dropped through the drill string, the lower ends of the hook shaped portions 38 are gradually forced apart by engagement with the sloping upper portion of the spearhead 28 until they pass beyond the lower laterally inwardly facing surface 40 of the spearhead 28 at which time the spring 36 forces the hook shaped portions 38 inwardly into latching engagement with the surface 40 whereby the tube assembly 26 can be lifted. It should be further noted that overshot 30 has a tubular extension portion 31 at the lower end thereof which is suitably slotted, to permit the hook portions 38 of the latches 34 to freely pivot laterally therethrough.

Located above the tubular extension portion 31 (FIG. 2a) is a tubular overshot latch release 15 which freely encompasses the overshot assembly 30 when it is desired to release the overshot 30. This is done when positioning is suitably rigidly secured to the lower end of the upper plug 48, such as by threads 54, and extends centrally of the drill string with its lower end being suitably secured such as by threads 56 to the upper end of a formed tubular member 58. The lower end of the member 58 is suitably secured, such as by threads 60, to a generally tubular lower plug 62. The plug 62 in turn encompasses a generally tubular member 64 and is suitably spaced therefrom by means of a cylindrical sleeve bearing 66 which engages and extends between the inner and outer cylindrical surfaces of the plug 62 and the member 64, respectively. As shown, a central portion 71 of an elongated shaft 70 extends centrally through and is slidably supported on the inner surface of the member 64. Thus the plug 48, tubular members 52 and 58 along with the annular plug member 62 and tubular member 64 comprise a substantially rigid elongated hollow member that is slidably supported by shaft 44 at the upper end and on the central portion 71 of the shaft 70 at the lower end.

The tubular member 52 has a series of longitudinally intermediate circumferentially spaced radially outwardly and upwardly extending holes 85 which connects the inner bore of the tubular member 52 with the annular space between the outer surface of the member 52 and the inner surface of the drill string for a purpose hereinafter disclosed. Located beneath the holes 85 in the tubular member 52 are a plurality of suitable circumferentially spaced openings 87 in which spherical balls 86 are rotatively suitably retained respectively as by a sleeve 87' or suitably flanging the opening to retain the balls 86. The balls 86 are located on a single transverse plane of the member 52. The outer portions of the balls 86 are located in the annular groove 86' previously described to lock tubular member 52 to the drill string 2 as hereinafter described (see FIG. 2b). Located beneath the balls 86 on tubular member 52 is an annular shoulder 87" that tapers inwardly to engage the tapering shoulder 86" to prevent the inner tube assembly 26 from going down further into the drill string. The engagement of annular shoulder 87" of the inner tube assembly 26 on the annular shoulder 86" of the drill string assembly properly locates the inner tube assembly 26 relative thereto. Located in the lower end of the tubular member 58 beneath the holes 85 and balls 86 are a plurality of circumferentially spaced radially outwardly and downwardly extending holes 88 for communicating the interior of the tubular member 58 with the annular space between the outside surface of the tubular member 58 and the inside wall surface of the drill string 1 for a purpose to be described hereinafter.

Shaft member 44, which slidably supports tubular member 52, has an intermediate outwardly extending flange portion 79, the upper surface of which is engaged by the lower end of a suitably closed end helical spring 90. The spring 90 extends between the flange 79 and a plurality of annular washers 91 which are closely slidably received on the upper end of shaft 44 the upper one of which is biased by the spring 90 into abutting relation with the lower surface of the upper plug 48. The spring 90 also biases the shaft 44 downward. The shaft member 44 has a cylindrical enlarged portion 92 extending centrally below the flange 79, the outer surface of which engages with rolling contact the inner periphery of the balls 86 as shown in FIGURE 2b. Directly below the enlarged portion 92 of shaft 44 is another centrally extending cylindrical portion 93 of reduced diameter on to which is threadedly secured a suitable water valve 94. The valve 94 may be secured in any well known manner as by nut means 95 threadedly secured onto the threaded end of reduced diameter cylindrical portion 93. When the shaft 44 is moved upwardly relative to tubular member 52, balls 86 roll over the outer surface of the enlarged portion 92 and after enlarged portion 92 has passed thereby the balls 86 are free to engage that portion of the shaft 44, which is of reduced diameter 93 as more specifically shown in FIGURE 3.

The water valve 94 is an annular plug member that has its top section tapering radially inwardly and upwardly to provide an annular tapered seating surface 23 such as the frustum of a cone. The inner surface of the tubular member 52 is provided with an integral radial downward and outwardly tapering annular shoulder 24 which provides an engaging seating surface for the water valve 94. Thus as water valve 94 is moved upwardly relative to tubular member 52, the annular tapered seating surface 23 of water valve 94 engages the annular tapered shoulder 24 on tubular member 52 to block the passage of water therethrough. Since water valve 94 is threadedly secured to the threaded end of the reduced diameter portion 93 of shaft 44 the relative position of water valve 94 thereon may be threadedly adjusted and locked in position thereon by the lock nut 95. This adjustment is utilized to regulate when annular tapered sealing surface 23 of water valve 94 engages the tapered shoulder 24 on tubular member 52 when relative movement between water valve 94 and tubular member 52 occurs. Thus water valve 94 may be adjusted to require greater relative movement therebetween before the passage of water is blocked therethrough for a purpose as more fully explained below.

The elongated shaft 70 is slidably supported adjacent the upper end by the plug member 62 as previously described and at the lower end the shaft 70 is fixed to the upper end of the core receiver tube 20. Core receiver tube 20, as shown in FIG. 2c, has its inner upper end threaded so that an elongated annular head 74 having a lower threaded end may be secured to the core receiver tube 20 through their complementary threaded ends. Annular head 74 has a central longitudinally extending bore 72 therethrough so that the annular head 74 with core receiver tube 20 may be mounted on the lower end of shaft 70. To retain the core receiver tube 20 with the annular head 74 in fixed relation to shaft 70, shaft 70 is threaded at the lower end thereof to accommodate a suitable locking means such as a pair of lock nuts 76. As annular head 74 is slid onto the lower end of shaft 70, lock nuts 76 are threaded thereon to lock annular head 74 between the lock nuts 76 and washers 99 and 98 which abut a shoulder 80 on shaft 70 (as more fully described below) to thereby secure core receiver tube 20, annular head 74 and shaft 70 bodily together.

Elongated shaft 70 is a stepped shaft having its lower portion of a relatively small diameter, and the end portion 75 adjacent the upper end of a relative large diameter. The end portion 75 of shaft 70 terminates into a reduced diameter centrally extending section 75' upon which is mounted a frusto-conical tapered valve member 96 which is suitably secured to the shaft 70 by any suitable means such as a cotter pin 97 and washer means 89. The tapered valve member 96 engages and seats itself on an annular frusto-conical tapered seat surface 102 on the lower end of the tubular member 58 as more fully described below. Intermediate the upper and lower ends of shaft 70 is an intermediate portion 71, the diameter of which is larger than the lower end portion of shaft 70 but smaller than the end portion 75 of shaft 70 to thereby provide longitudinally spaced annular shoulders between the respective changes in diameters of the shaft 70. Thus a shoulder 81 is formed between the enlarged end portion 75 of shaft 70 and the intermediate portion 71 of shaft 70. A further shoulder 80 is formed on shaft 70 between the lower end portion of shaft 70 and the intermediate portion 71. A plurality of annular spacers 99 and a washer 98 in abutting relationship are received on the lower end portion of the shaft 70 with the upper surface of the washer 98 engaging the shoulder 80 on shaft 70 so that by screwing the lock nuts 76 thereon the annular head 74 will be rigidly secured to shaft 70 along with core receiver tube 20. A Belleville spring 100, or a series of such springs as required, is located on shaft 70 on the intermediate portion 71 between the upper surface of the washer 98 and the lower surface of the tubular member 64 to resiliently bias member 64 upward relative to shaft 70. Thus tubular member 64 is slidably mounted on shaft portion 71 along with tubular members 58, 52 and plug 48.

In order to limit the degree of relative longitudinal movement between shaft 70 and tubular member 64, a suitable roller bearing 83 with an upper race 82 is mounted on shaft 70 with the upper race in abutting relationship with shoulder 81 which is the juncture of the upper end portion 75 of shaft 70 and the intermediate portion 71 of shaft 70. The bearing 83 has a lower race 84 which abuts the upper end of tubular member 64, spacer 66 and the upper end of tubular lower plug 62. Thus as Belleville spring 100 biases tubular member 64 upwardly relative to shaft 70, member 64 will be limited in its upward movement, until the bearing 83 along with race 82 comes into engagement with the shoulder 81 of shaft 70. When Belleville spring 100 is compressed such as where a force is exerted on the core receiver tube 20 the spring 100 permits the shaft 70 to move upward relative to tubular member 64, which causes valve member 96 (located on the upper end of shaft 70) to engage the tapered seat surface 102 (FIG. 2b) of the tubular member 58. By this action fluid passing through the circumferentially spaced radially outwardly extending holes 88 of tubular member 58 will be blocked and pressure will be built up above the valve member 96 to signal the operator that a full core has been cut or that blockage has occurred.

Figure 1:
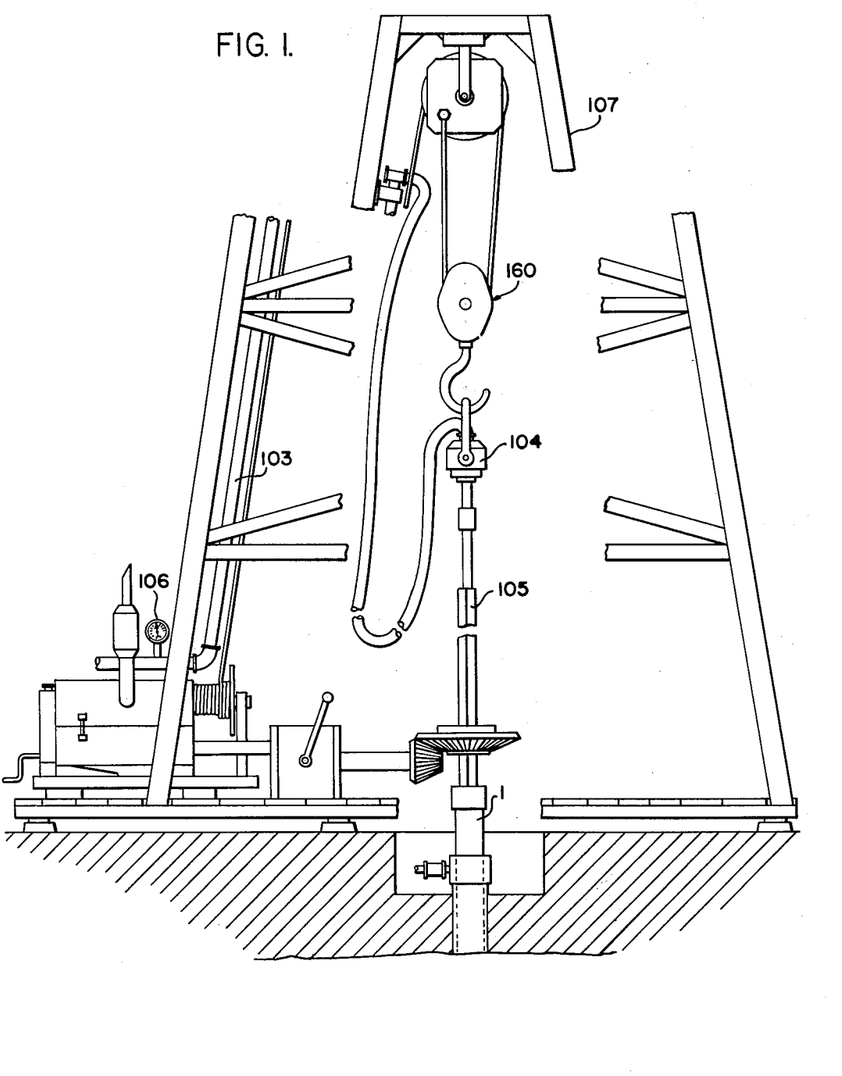
FIG. 1 is a simplified side elevational view of a drilling rig for operating the drilling apparatus constructed in accordance with the principles of this invention.

During a drilling operation the water or other suitable coolant fluid is pumped via suitable conduits 103 (see FIG. 1) through a suitable water swivel 104 that is adjustably supported by a block and tackle 106 from a derrick 107. The fluid thence flows into the bore of the drill string. The drill string is rotated by means of a suitable kelly 105 which is operatively connected by means of bevel gears to a prime mover as is well known in the art. Reference to down and upward hereinabove and thereafter are used to designate relative directions viewing the figures with the drill string going vertically downward into the ground. It will be understood that this reference is one of convenience in explanation and that the axes of direction with reference to the apparatus may be rotated without departing from the scope of the invention.

With the above described structure in the location shown the coolant water will flow downward between the drill rod 1 and the tubular member 52, down through the holes 85 into the interior of tubular member 52, past the balls 86, past valves 94 and 96 through holes 88 and on between the inner wall of the drill string 2 and outer wall of tubular member 58 down past the outer surface of the core receiver tube 20 to the bottom of the drill string where the fluid performs its function of cooling and cleansing the hole drilled and through flowing to the surface through the clearance space provided by the drilled hole the outside wall of the drill string to the surface of the hole being drilled as is well known in the art.

After the drilling operation is begun wherein the drill string including drill rods 1 and the bit is rotated, the drill string is not removed from the hole until the bit is worn out. The core which is cut by the bit passes through the core lifter and case into the core receiver tube 20. As the bit continues to cut, the core pushes against the core receiver tube 20. This force is transmitted through the core receiver tube 20 onto head 74, spacers 99, washer 98, to the Belleville spring 100 which is thus compressed, which eventually allows the shaft 70, the valve 96 to move into engagement with the seat surface 102 (FIG. 2b) located on the tubular member 58, closing off the water flow. The same force may be created by a blockage of the core receiver tube 20 as is well understood in the art. When the flow is cut off, the mud pump on the surface builds up excessive pressure which registers on the pressure gauge 106 at the operator's position and the driller knows that the core barrel is either blocked or filled. The overhot 30 is lowered by means of a wire cable 32 into the drill string until the hook shaped portion 38 latches over the point 28. The overshot 30 may also be lowered by free falling or by free falling with the aid of fluid pressure as will be described. The wire cable is reeled in by means of a hoist as is well known in the art. The pull exerted by the overshot 30 on the spearhead 28 is transmitted through pin 46 to the shaft 44 to compress spring 90. Since balls 86 are seated in the annular groove 86' the tubular member 52 is held rigid with respect to the drill string as is plug 48 thus providing a reactive surface for the spring 90. As the spring 90 is compressed by further opened movement of shaft 70, that portion of shaft 70 of reduced diameter 93 (FIG. 2) comes opposite balls 86 allowing the balls 86 to move inwardly and engage the reduced section 93 of shaft 44 to thereby unlock the engagement between the coupling section 2 of the drill string and the tubular member 52. Upon further reeling in by the hoist the wire line pulls the overshot 30, tube assembly 26, shaft 70 and core receiver tube 20 with the core therein to the surface.

There are various methods by which this tube assembly may be put back into drilling position in the drill string. The first method is by free dropping the tube assembly into the hole. This technique is used on vertical holes that have water in them. The tube assembly is put into the drill string. When the balls 86 come into contact with the drill string, the operator pulls the spearhead point out to compress the spring 90 to allow the balls 86 to move inwardly to engage the reduced diameter portion 93 of shaft 44, making it possible to drop the tube assembly down the inside of the drill rods. The tube assembly falls until the shoulder 86" and 87" on tubular coupling section 2 and tubular member 52 respectively come in contact to seat the inner tube assembly 26 in position on the drill string. Upon seating of these members a further downward relative movement between the drill string; namely, coupling section 2 and the shaft 44 will occur due to the momentum on the initial fall. As the shaft 44 continues to move downward the enlarged portion 92 thereof will wedge the balls 86 outwardly into the recess 86' of the coupling section 2 and thus lock the inner tube assembly 26 to the drill string.

Figure 3:
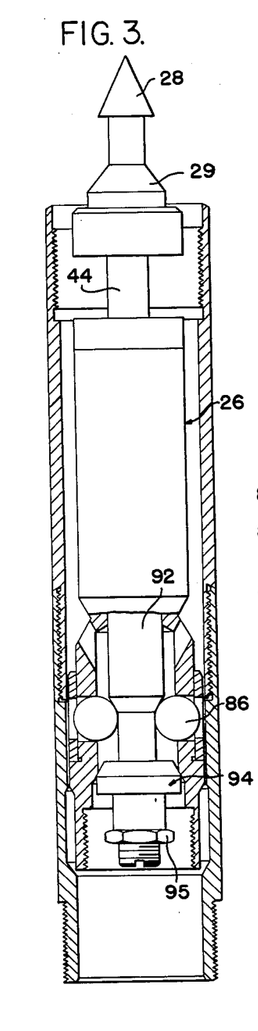
FIG. 3 is a partial cross sectional view, having portions thereof shown in elevation, of the drilling apparatus of FIG. 2b showing the locking means thereof in an unlocked position.

An important feature of this invention is that the rate of descent of the tube assembly 26 can be controlled by the water valve 94. Closing the valve 94, as shown in FIG. 3, will cause the descent to be slow because the flow of water up the clearance space provided between the inner surface of the drill string and outer surface of the inner tube assembly 26 past balls 86 is restricted. Realizing there is water in the hole as valve 94 is opened, as shown in FIG. 2b, water will flow freely up the clearance space provided between the inner surface of the inner tube assembly 26 to by-pass the restriction of the balls 86 since water valve 94 does not restrict the flow of fluid therethrough between the holes 85 and the holes 88 as more fully described above, to thereby provide for an unrestricted flow of water and a corresponding increase in the rate of descent. As described above, by screwing water valve 94 upwardly on the lower threaded portion of shaft 44 the clearance space between tapered seating surface 23 of water valve 94 and the annular tapered shoulder 24 on tubular member 52 may be reduced to restrict the rate of flow of water past the water valve 94 and shoulder 24 to correspondingly reduce the rate of descent of tube assembly 26. By adjusting the water valve 94 upwardly on the lower threaded portion of shaft 44 the clearance space between water valve 94 and the shoulder 24 may be adjusted to eliminate the clearance to thus provide for a maximum restriction to water flow and thereby provide for a minimum rate of descent. It is to be particularly noted that under any of these circumstances there is never complete cut-off of water circulation to the bit when drilling. Thus the tool bit will not burn up. When the water valve 96 engages surface 102 to cut off the main water flow, there is sufficient water flow in the space between the drill string 1 and the inner tube assembly 26 to permit water to reach the drill bit.

Figure 8:
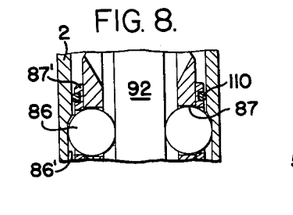
FIG. 8 is a partial cross sectional view, having portions thereof shown in elevation, of the lock means showing a modification of the sleeve retaining means with sealing means.
Figure 9:
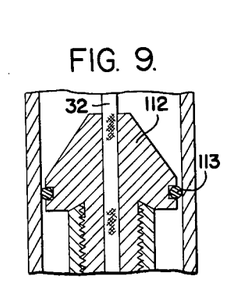
FIG. 9 is a partial cross sectional view, having portions thereof shown in elevation, of a modification of the overshot assembly with sealing means.

A method of positioning the tube assembly into a horizontal or vertical hole for further drilling, such as are found in underground drilling, is to place the tube assembly in the drill rods in the same manner as for free dropping with the water valve 94 seated as shown in FIG. 3. However, in this instance the sleeve 87' has an O ring 110 suitably mounted on its outer periphery (FIG. 8) to slidably engage the inner wall of the drill string 1 and thereby act as a sealing means to prevent the passage of fluid in the clearance space provided between the drill string 1 and the inner tube assembly 26 located therein. The mud pump is attached to the drill rods and pressure is built up, since the O ring 110 is mounted on sleeve 87' and the water valve 94 is seated on the inner shoulder 24 of tubular member 52 to thereby block the passage of fluid and thus the fluid pressure built up by the mud pump pushes (or pumps) the tube assembly 26 into the hole. When the tubular member 52 via shoulder 86"

seats on the shoulder 87″ of coupling section 2, the fluid pressure as set up by the mud pump will continue to exert pressure on the inner tube assembly 26 causing the tube assembly 26 to move further relative to the stationary drill string 1 and to thereby unseat water valve 94 from the annular tapered shoulder 24 on tubular member 52 and thus relieve the fluid pressure since a clearance space is now provided for the passage of fluid. As the inner tube assembly thus moves relative to the stationary drill string 1 balls 86 are forced radially outward in a manner as more fully explained above to lock the tubular member 52 to the coupling 2 in the drilling position and the mud pump pressure drops to normal. Drilling may now be begun. The provision of the O rings 110 on the sleeve 87′ as thus described is also used in angle downward holes to provide a faster rate of descent and to overcome frictional forces such as between the inner tube assembly 26 and the drill rods 1. In addition, the pressurized fluid in conjunction with the O rings 110 on the sleeve 87′ may be used in angle downward or down hole drilling to force the inner tube assembly down a hole that has a slight bend which does not restrict the passage of the drill string but offers resistance thereto.

In order to retrieve the inner tube assembly 26 from the hole, overshot 30 is provided with a suitable wire coupling 112 having an O ring seal 113 suitably journaled on the outer periphery thereof. Thus as the overshot 30 is placed in the drill string 1 the O ring 113 slidably engages the walls thereof and provides a tight fitting piston arrangement slidably positioned in the drill string so that as pressure is built up by the mud pump the overshot 30 is pumped into the drill string until the lower ends of the hook shaped portions 38 engage and latch the tube assembly 26 for retrieving the tube assembly 26, and the core receiver tube 20 with the core therein. In pumping the overshot 30 or inner tube assembly 26 into an up hole a conventional water swivel with a conventional wire line wiper is used to provide a reaction surface for the pressurized fluid as the mud pump builds up pressure and pumps the inner tube assembly 26 up the drill string. The wire line wiper permits the cable 32 to pass through the water swivel as the overshot 30 is pumped into a horizontal, vertical or angle hole,.

In the case of a dry hole the tube assembly cannot be "free" dropped because the rate of descent is too rapid. The tube assembly 26 is lowered into the hole with the overshot 30, overshot latch release 15 and wire line 32. When the tubular member 52 seats on the coupling 2, the weight of the overshot forces the hook portion of the latch 34 over the tapered shoulder 29 of the spearhead 28 forcing the hook portions 38 open. The overshot latch release 15 slides over the latch 34 holding the hook portions 38 in the "released" position as previously described. The wire line 32 and overshot 30 are reeled in leaving the tube assembly "latched" in drilling position.

Figure 4:
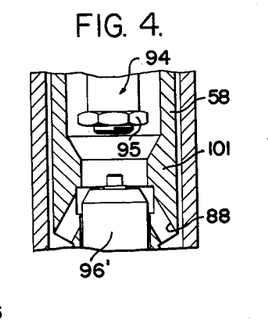
FIG. 4 is a cross sectional view, having portions thereof shown in elevation, of a modification of the valve control means of the drilling apparatus as shown in FIGS. 2 or 6.

A modification of the tapering water valve 96 is illustrated in FIG. 4 wherein a water valve 96′ which is a cylindrical member is suitably secured to the movable shaft 70 in the same manner as water valve 96 previously described. Immediately above the water valve 96′ is an annular inwardly cylindrical projection 101 on the inner portion of tubular member 58. The diameter of water valve 96′ is a dimension to be closely received by the bore of the annular cylindrical projection 101 of tubular member 52 to provide a close fitting relationship therebetween as water valve 96′ is moved upwardly relative to tubular member 58. Immediately below the annular cylindrical projection 101 of tubular member 58 is a plurality of suitably circumferentially spaced holes 88 as in the original embodiment for the passage of fluid therethrough. Thus the flow of fluid coolant is down centrally through tubular member 58, past water valve 96′ and through the spaced holes 88 into the clearance space provided by the drill string and the inner tube assembly. Upward movement of water valve 96′ will cause the side surface thereof to slidably engage the inner surface of the bore of the annular cylindrical projection 101 of tubular member 58 to cut off the water flow and thereby indicate a blocked core or full cut core as previously described.

Figure 5:
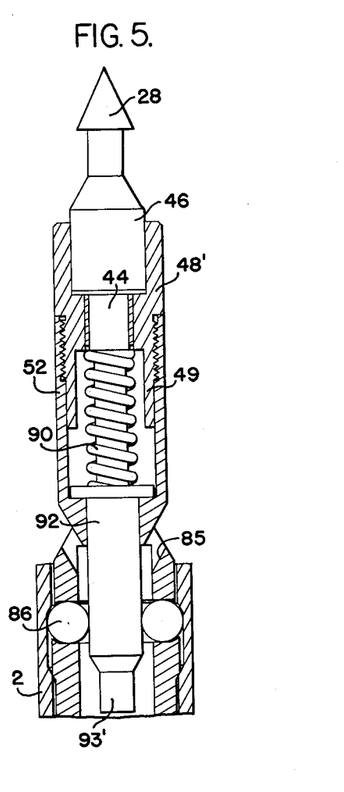
FIG. 5 is a partial cross sectional view, having portions thereof shown in elevation, of a modified tube assembly disclosing the lock means in locking engagement with the drill string.

A modified design of the spearhead 28 and shaft 44 is shown in FIG. 5. The structural features are similar to the original embodiment except for two changes. Shaft 44 as previously described and as contained in this embodiment has a closed end helical spring 90 slidably retained thereon between a plug member 48′ which is suitably slidably mounted on the upper end of shaft 44 and the intermediately located outwardly extending flange portion 79 on shaft 44. Shaft 44 has a cylindrical portion 92 extending centrally below the flange portion 79, the outer surface of which engages in rolling contact the balls 86. Shaft 44 terminates into a reduced diameter portion 93′ so that when the shaft 44 is moved upwardly relative to tubular member 52 the balls 86 roll over the outer surface of the enlarged portion 92 and after the enlarged portion 92 has passed thereby the balls 86 are free to engage the reduced diameter portion 93′ of the shaft 44. It is to be noted that the shaft 44 does not have any water valve 94 as disclosed in the original embodiment. A further structural difference is that plug member 48′ located on the upper end of shaft 44 has a relatively thin annular longitudinally elongated projection 49 at the lower end which terminates in an annular lip portion 45 at its lower end. The plug member 48′ is suitably connected to the tubular member 52 by means of a suitable threaded connection. The operation of this embodiment is similar to the original embodiment except that on reeling in the inner tube assembly 26 which is attached to the tubular member 52, and plug 48′, by means of the overshot assembly 30 which latches onto the spearhead 28 as previously described, the upward movement of shaft 44 will cause flange 79 to engage lip 45 of plug 48 and carry the inner tube assembly 26 upward therewith. By providing this arrangement the inner tube assembly provides a compact unit that functions exceedingly well under adverse conditions.

Figure 6:
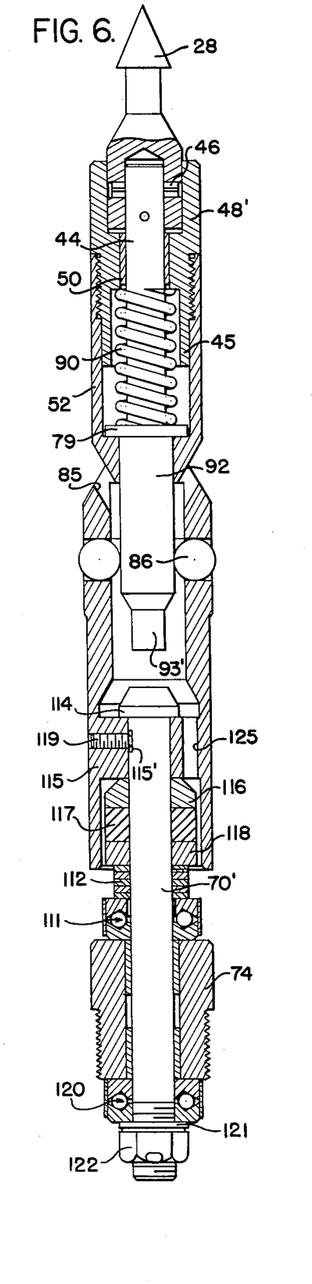
FIG. 6 is a longitudinal cross sectional view, having portions thereof shown in elevation, of the wire line inner tube assembly disclosing a modification of the fluid control means.

FIG. 6 discloses a modified design of the water shut off valve 96 shown in FIG. 2b. Shaft 44 has the spearhead 28 connected at the upper end thereto by means of pin 46. The lower end of shaft 44 is similar to the embodiment described in FIG. 5 wherein shaft 44 has a flange 79 intermediate the ends thereof below which is an enlarged portion 92 terminating into a reduced diameter portion 93′. The portion of tubular member 52 upwardly adjacent the lower end has a radially inwardly and longitudinally extending portion 115 having a plurality of circumferentially spaced bores 125 extending longitudinally therethrough the axes of which are preferably parallel to the axis of the tubular member 52. The bores 125 connect the clearance space provided in the portion of tubular member 52 below the ball 86 with the lower end of tubular member 52. To suitably slidably connect elongated shaft 70′ to tubular member 52, a set screw 119 is threadedly secured to the portion 115 and into a longitudinally elongated keyway recess 115′ in the upper end of shaft 70′. To further maintain shaft 70′ in proper location to the tubular member 52 the upper end of elongated shaft 70′ has a radially outwardly extending flange 114 which provides a lower surface so that when shaft 70′ is assembled within tubular member 52, the bottom annular surface of flange 114 engages the upper surface of the portion 115 of tubular member 52. The set screw 119 extends radially of the portion 115 and into the keyway recess 115′ to slidably secure the shaft 70′ and the tubular member 52. The core receiver tube 20 is suitably threadedly secured to annular head 74 as previously described is slidably and rotatably mounted on the lower end of shaft 70′. Nut and washer means 122 and 121 respectively, suitably threadedly secured to the lowermost end of shaft 70' limit the downward movement of core receiver tube 20 and annular head 74 thereon. To properly maintain a rotatable relationship between elongated shaft 70' and the core receiver tube 20 with annular head 74 thereon, a roller bearing unit 120 is suitably journaled between the lower annular surface of annular head 74 and top surface of the washer 121 that is suitably retained on shaft 70'. The weight of the core receiver tube 20 and annular head 74 is thus carried by the bearing unit 120.

To properly regulate the flow of coolant fluid through the inner section of tubular member 52 through the bores 125 and on down through the lowermost portion of the tubular member 52 past the intermediate portion of shaft 70' and on down past the core receiver tube 20 between the clearance space of inner wall surface of the drill string and the outer wall surface of the core receiver tube 20 to the drill bit, a suitable annular resilient type water valve 117 is slidably mounted on the intermediate portion of shaft 70'. It will be understood that the resilient type water valve 117 is made of any suitable material such as rubber which permits radial expansion upon axial compression. The resilient water valve 117 is located upwardly adjacent the lower end of the tubular member 52 and cooperates with the side walls thereof in a manner to be described to close off the coolant flow upon radial expansion thereof.

To suitably mount resilient water valve 117 on the elongated shaft 70', an annular washer 116 is mounted above the resilient valve 117 on shaft 70' with the upper surface of washer 116 engaging the lower surface of the annular portion 115 of tubular member 52. An annular washer 118 is slidably mounted on shaft 70' with its upper surface in contact with the lower surface of the resilient water valve 117. In addition to the washer 118, a suitable roller bearing unit 111 is slidably mounted on shaft 70' below washer 118 having its bottom surface abutting the top surface of annular head 74. A plurality of spacer washers 112 are mounted on shaft 70' between the roller bearing unit 111 and the washer 118 to locate the valve 117 on the intermediate portion of shaft 70' adjacent the lower end of the tubular member 52 so that when the annular head 74 is moved upward as heretofore described relative to the drill string a force is exerted on the bearing unit 111 which transmits such force through the washers 112 and 118 to the resilient water valve 117. The washer 116 above the valve 117 engages the stationary tubular member 52 whereby the water valve 117 is compressed expands radially into engagement with the inner wall of the tubular member 52 to close off the clearance space provided between the tubular member 52 and the water valve 117 and the adjacent washers 116 and 118 to thereby close off circulation of the coolant fluid to the drill bit 4. This blockage will cause a rise in the fluid pressure which indicates to the drill operator that the core barrel is blocked or filled as more fully set forth above.

Figure 7:
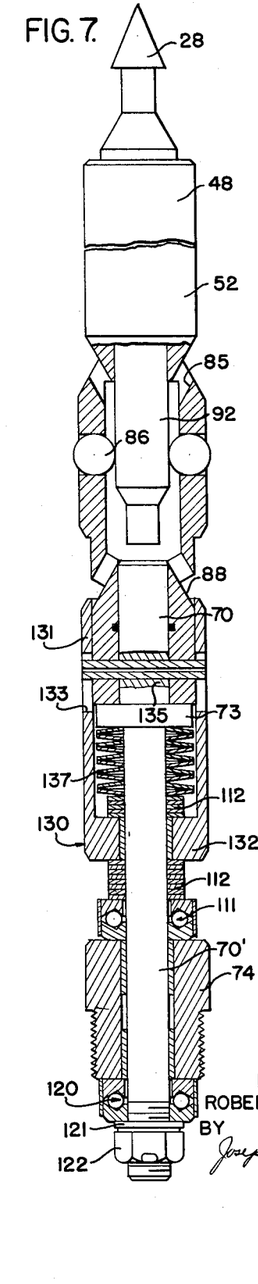
FIG. 7 is a longitudinal cross sectional view, having portions thereof shown in elevation, of the wire line inner tube assembly disclosing a further modification of the fluid control means.

FIG. 7 discloses a further modified design of the water shut off means shown in FIG. 6. The structure is similar to that shown in the previously described embodiment, however, in this instance the valve member is a cup shaped sleeve valve 130 having a tubular upper portion 131 with a pair of opposed elongated slots 133 therein and a lower bottom portion 132 which slidably engages the intermediate portion of elongated shaft 70'. The sleeve valve 131 has its bottom surface of the bottom portion 132 abutting the top surface of the uppermost washer 112 of the plurality of washers 112. The elongated shaft 70 has a flange 73 immediately above the intermediate portion of shaft 70' with an enlarged diameter portion 70'' above the flange 73. Intermediate the upper end of elongated shaft 70' and the flange 73 of elongated shaft 70' is a transverse hole 135 with a roll pin 134 extending therethrough and into the elongated slots 133. Thus the roll pin 134 limits the extent of longitudinal movement of sleeve valve 130 on shaft 70' as determined by the length of the elongated slots 133. A Belleville type spring 137 is mounted on shaft 70' between the flange 73 and the top surface of the bottom portion 132 of sleeve valve 130 to bias sleeve valve 130 downward with respect to shaft 70' so that the sleeve valve 130 is in its lowermost position as determined by the length of slot 133. To maintain proper bias on spring 137 spacer washers 112 are inserted between the lowermost end of spring 137 and the top surface of the bottom portion 132 of sleeve valve 130, as shown in FIG. 7.

As in the previously described embodiments circumferentially spaced radially inwardly and downwardly extending holes 85 in tubular member 52 direct coolant fluid into the interior of tubular member 52. These holes 85 are located above the balls 86. Located below balls 86 on tubular member 52 are a plurality of suitably circumferentially spaced radially outwardly and downwardly extending holes 88 that connect the interior of tubular member 52 with the clearance space provided by the inner wall of the drill string and the outer wall of the sleeve valve 130 for directing the coolant fluid down to the drill bit 4. The coolant fluid enters holes 85 and flows down through tubular member 52 out through the bores 88 down the clearance space as set forth above to the drill bit 4. On upward movement of the sleeve valve 130 due to the upward force and movement exerted on core receiver tube 20 because of blockage or a filled core receiver tube 20, force is exerted on annular head 74 which in turn transmits the force to sleeve valve 130 which thereby causes the uppermost end portion of tubular portion 131 of sleeve valve 130 to slidably cover the holes 88 to thereby block the flow of coolant fluid and thereby cause a build-up of pressure in the drilling fluid lines which registers on the gauge 106 at the operator's position to indicate a blockage or full core in the core receiver tube 20, as previously described.

While there has been disclosed and described above several specific embodiments of the invention, it will be appreciated that the invention may be practiced with other modifications without departing from the spirit or scope of the invention as set forth in the appended claims.

What I claim as new and desire to secure by Letters Patent is:

1. A device connectable to a core barrel for controlling the movement of such a core barrel in a drill string comprising, an elongated member of a lateral configuration throughout the length thereof to be slidably received within such a drill string and having one end connectable to a core barrel, said elongated member having an axially extending hollow portion with at least one open ended passageway extending laterally through the side thereof, said passageway being spaced axially from said one end of said elongated member, a stem means supported by said elongated member to extend axially within said hollow portion and laterally inwardly of the internal surface of said hollow portion, valve means supported by said stem means within said hollow portion with the peripheral surface thereof located adjacent a portion of said internal surface, said valve means being axially intermediate said one end and said passageway, at least one of said means having means cooperable with the other of said means to secure said valve means in any one of a plurality of relative positions on said stem means to vary the opening between said surfaces, said elongated member having an open ended passageway extending between said hollow portion and the exterior of said elongated member, and said last mentioned passageway being spaced from said valve means toward said one end.

2. A device as defined in claim 1 in which said valve means is locatable in one position with respect to said stem means with said surfaces engaging each other.

3. A device as defined in claim 2 in which said engaging surfaces are mating tapered surfaces.

4. A device as defined in claim 1 in which an elongated core receiving member is extendably connected to said one end of said elongated member to coaxially extend therefrom and said core receiving member having a portion engageable with a portion of said internal surface of said hollow member intermediate said passageways upon movement of said core receiving member toward said one end.

5. A device connectable to a core barrel for controlling the movement of such a core barrel in a drill string comprising, an elongated member of a lateral configuration throughout the length thereof to be slidably received within such a drill string, said elongated member having an axially extending hollow portion with at least one open ended passageway extending laterally through the side thereof, said passageway being located in the upper portion of said hollow portion, a stem means supported by said elongated member to extend coaxially within said hollow portion and laterally inwardly of the internal surface of said hollow portion, valve means supported by said stem means within said hollow portion with the peripheral surface thereof located adjacent a portion of said internal surface, said valve means being located axially below said passageway, at least one of said means having means cooperable with the other of said means to secure said valve means in any one of a plurality of relative positions on said stem means to vary the opening between said surfaces, said elongated member having an open ended passageway extending between said hollow portion and the exterior of said elongated member, and said last mentioned passageway being located axially below said valve means.

6. A core barrel as defined in claim 5 in which said valve means is locatable in one position with respect to said stem means with said surfaces engaging each other.

7. A device as defined in claim 5 in which an elongated core receiving member is supported by said elongated member to coaxially depend therefrom and said core receiving member having an upper portion engageable with a portion of said internal surface of said hollow member intermediate said passageways upon upward movement thereof.

8. A device as defined in claim 6 in which said engaging surfaces are mating tapered surfaces.

References Cited in the file of this patent
UNITED STATES PATENTS

| | | |
|---|---|---|
| 391,431 | Shoff | Oct. 23, 1888 |
| 1,845,683 | Saunders | Feb. 16, 1932 |
| 2,164,598 | Thrift | July 4, 1939 |
| 2,373,323 | MacReady | Apr. 10, 1945 |
| 2,374,961 | Sewell | May 1, 1945 |
| 2,532,716 | Havlick | Dec. 5, 1950 |
| 2,572,308 | Brown | Oct. 23, 1951 |
| 2,652,232 | Holland | Sept. 15, 1953 |
| 2,737,245 | Knox | Mar. 6, 1956 |
| 2,857,138 | Svendsen et al. | Oct. 21, 1958 |
| 2,890,022 | Brown | June 9, 1959 |

FOREIGN PATENTS

| | | |
|---|---|---|
| 221,456 | Australia | Dec. 12, 1957 |